United States Patent [19]

Kurosawa et al.

[11] Patent Number: 4,767,259
[45] Date of Patent: Aug. 30, 1988

[54] COOLING AIR FLOW CONTROLLING APPARATUS FOR GAS TURBINE

[75] Inventors: Soichi Kurosawa, Hitachi; Kazuhiko Kumata, Katsuta, both of Japan

[73] Assignee: Hitachi, Ltd., Tokyo, Japan

[21] Appl. No.: 888,007

[22] Filed: Jul. 22, 1986

[30] Foreign Application Priority Data

Jul. 29, 1985 [JP] Japan .................. 60-165996

[51] Int. Cl.$^4$ .......................................... F04D 29/58
[52] U.S. Cl. ......................................... 415/17; 415/175
[58] Field of Search ............ 415/17, 115, 175, 47, 415/48, 15

[56] References Cited

U.S. PATENT DOCUMENTS 3,423,941 1/1969 Evans .................................. 415/47

FOREIGN PATENT DOCUMENTS 112826 9/1980 Japan .

Primary Examiner—Larry I. Schwartz
Attorney, Agent, or Firm—Antonelli, Terry & Wands

[57] ABSTRACT

Stator blades and rotor blades are cooled by discharge air discharged from an air compressor coupled directly with gas turbine. A signal of the compressor discharge pressure and a signal of turbine exhaust gas temperature are obtained, and cooling air flow is controlled based on these signals.

7 Claims, 2 Drawing Sheets

COOLING AIR FLOW CONTROLLING APPARATUS FOR GAS TURBINE

BACKGROUND OF THE INVENTION

The present invention relates to a cooling air flow controlling apparatus for a gas turbine, and more particularly, to an apparatus for controlling cooling air at an optimum discharge amount according to a combustion condition of the gas turbine being cooled with the cooling air.

It is well known that gas turbine efficiency can be improved rapidly with higher firing temperature as a working medium. However, with increases in the firing temperature, it is necessary to make improvements in component materials.

To provide an increase of the firing temperature, the use of the high temperature-resisting material is essential. Under existing techniques, however, material development has levelled off and substantial improvements in materials are not expected. Therefore, a method for lowering the working material temperature is achieved frequently by cooling the material itself.

Among the components members of the gas turbine, a first stage stator blade is exposed to the maximum firing temperature, and the temperature condition is mitigated at a first stage rotor blade, a second stage stator blade, and a second rotor blade in order. The gas turbine used as a power generating plant adopts a cooling method which includes the steps of compressing by an air compressor directly coupled with the gas turbine, cooling the compressed air with an intercooler, and cooling the stator blade and the rotor blade by the decreased temperature air.

For the sake of an increase of the power generating plant efficiency, the cooling air consumption is desired to be the minimum required amount so as to maintain the temperature in the stator blade and the rotor blade at an allowable value.

In, for example, Japanese patent laid-open publication No. 112826/1980, is proposed that the exhaust gas temperature of the gas turbine is detected, and a cooling air flow is controlled according to the detected exhaust gas temperature.

In this conventional apparatus, when the atmospheric temperature is constant, there is a correlation between the exhaust gas temperature and the firing temperature, so that the control of the cooling air flow can be done accurately. However, when the atmospheric temperature changes, the above correlation is incorrect and problems result.

Therefore, the atmospheric temperature is set at a maximum temperature, for example 50° C., corresponding to the worst condition expected cooling, and the required cooling air flow determined according to the exhaust gas temperature is correlated by the above atmospheric temperature setting. For that reason, when the actual atmospheric temperature is lower than 50° C., more than the necessary amount of cooling air flow is supplied into the apparatus, thereby the power generating plant efficiency decreases.

It has also been considered that the firing temperature of the gas turbine may be measured directly by means of a sensor, and then the cooling air flow may be controlled according to the measured firing temperature. However, when the firing temperature is above 1000° C. and flows in a gas path at high speed, it is difficult to obtain a sensor having high reliability over a long term, so that this control method has not yet been realized for practical use.

SUMMARY OF THE INVENTION

An object of the present invention is to provide an apparatus wherein metal temperature of hot gas parts of the gas turbine such as a rotor blade and a stator blade etc. is maintained at the proper value and can be adjusted by the cooling air flow at the necessary maximum limit.

Another object of the present invention is to provide an apparatus wherein firing temperature is not measured directly but the estimated accurately by another operating parameter so that the necessary cooling air flow can be properly controlled.

As to a control apparatus of the present invention which is made so as to attain above objects, first of all the fundamental principle is given a brief account as follows.

In the conventional techniques, the cooling air flow control of the hot gas parts is carried out entirely according to the exhaust gas temperature of the gas turbine. However, the standard for the cooling air flow control should be the firing temperature and should not be the exhaust gas temperature. Assuming that the atmospheric condition such as atmospheric temperature is constant, the above conventional techniques (namely, a cooling air flow control based on the exhaust gas temperature standard) is effective.

But when the atmospheric condition is not constant, the firing temperature must be calculated, and then it is necessary to carry out the control of the cooling air flow according to calculated the firing temperature.

In other words, to attain the proper temperature control for the hot gas parts of the gas turbine, it is necessary to adjust the cooling air flow according to a correlation of the calculated cooling air flow with the firing temperature.

A cooling air flow controlling apparatus of the present invention includes a detecting means for detecting pressure of the discharge air from the air compressor, a detecting means for detecting exhaust gas temperature of the gas turbine, and a calculating means for calculating a necessary cooling air flow signal from a discharge air pressure signal and an exhaust gas temperature signal, thereby the cooling air control valve is controlled by an output signal of the calculating means.

The air discharged from the air compressor is conducted to outside of the gas turbine via a conduit means. The cooling air control valve is an air flow adjustment valve, and a flow amount of the cooling air is controlled by the air flow adjustment valve and supplied into the vicinity of a stator blade of the gas turbine.

An intercooler is disposed midway of the cooling air passage, and the cooling air is cooled by the intercooler and then supplied into the vicinity of a stator blade of the gas turbine.

DETAILED DESCRIPTION OF A PREFERRED EMBODIMENT

Figure 1:
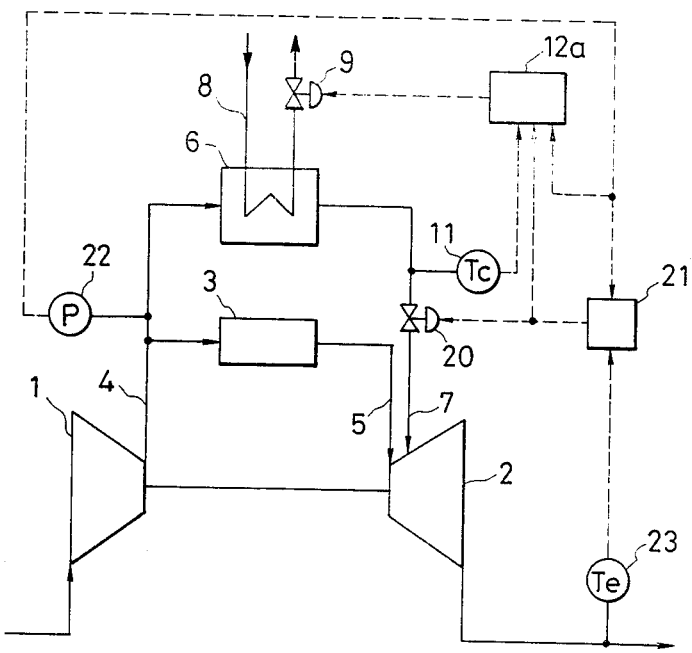
FIG. 1 is a cooling control system diagram showing one embodiment of the present invention.

An embodiment of the present invention will be described with respect to FIG. 1 which is a cooling system diagram of the gas turbine with a control system for carrying out the present invention.

Discharge air 4 discharged from an air compressor 1 is introduced into a combustor 3 via a conduit means and combustion gas or firing gas 5 exhausted from the combustor 3 is introduced into the vicinity of a stator blade of a gas turbine 2. A part of the discharge air 4 is heat-exchanged with cooling water 8 in an intercooler 6.

Pressure of the discharge air 4 from the air compressor 1 is measured by a manometer 22. Exhaust gas temperature of the gas turbine 2 is measured by a thermometer 23. The discharge pressure (P) and the exhaust gas temperature (Te) are inputted in a flow computing element 21. A necessary cooling air flow is calculated by the discharge pressure and the exhaust gas temperature within the flow computing element 21. These quantities are related to each other through the general characteristics of the gas turbine 2 as shown in FIG. 2.

Utilizing the relationship that the firing temperature can be calculated by the discharge pressure and the exhaust gas temperature, thereby the necessary cooling air flow corresponding to the firing temperature is calculated.

Figure 2:
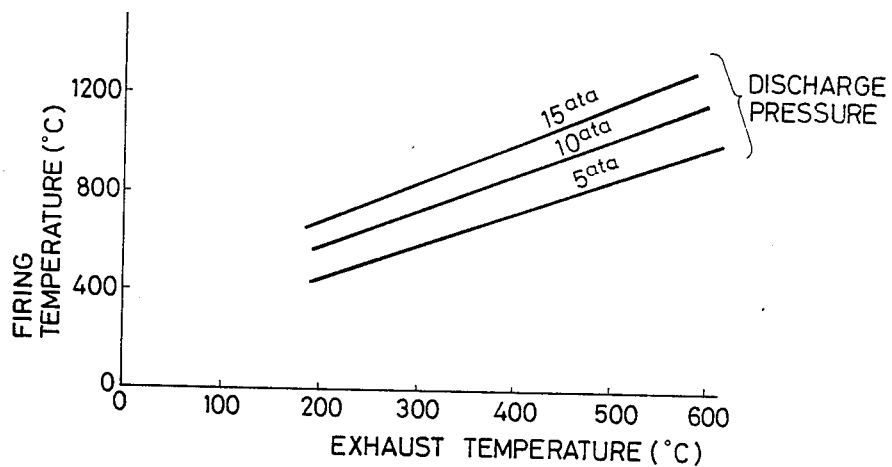
FIG. 2 is a diagram showing the relationship between the exhaust gas temperature, the discharge pressure and the firing temperature of the FIG. 1 embodiment of the present invention.
Figure 3:
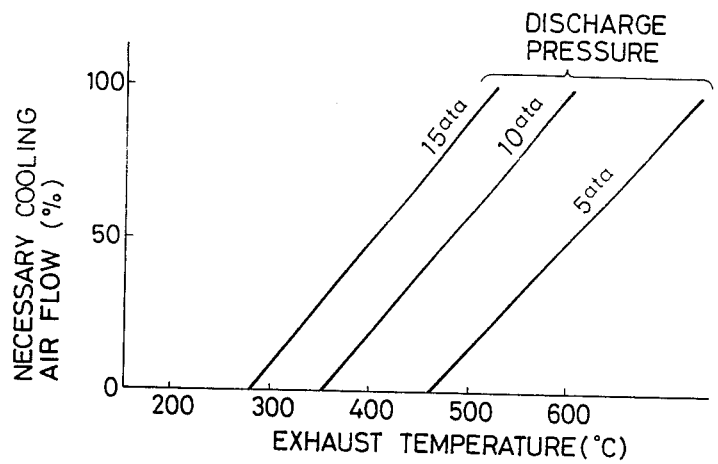
FIG. 3 is a diagram showing the relationship between the exhaust gas temperature, the discharge pressure and the necessary cooling air flow of the FIG. 1 embodiment of the present invention.

The relationships between the exhaust gas temperature, the discharge pressure and the necessary cooling air flow shown in FIG. 3 and the relationships between the exhaust gas temperature, discharge pressure and the firing temperature shown in FIG. 2 are inputted within the flow computing element 21. The necessary cooling air flow is calculated by the flow computing element 21, a signal gives the instructions to an air flow control valve 20, accordingly the flow amount of the cooling air 7 is controlled by the air flow control valve 20.

Figure 4:
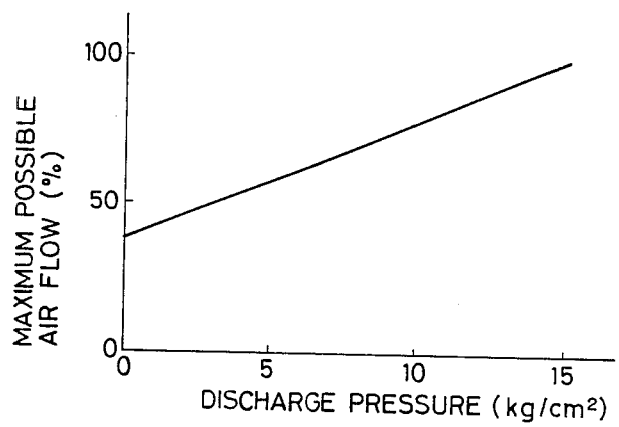
FIG. 4 is a diagram showing the relationship between the discharge pressure and the maximum possible air flow percentage of the FIG. 1 embodiment of the present invention.

The maximum possible flow of the cooling air 7 arises from at full-open state of the air flow control valve 20 and is determined through following formula according to the pressure of the discharge air 4.

$$G = A \cdot K \cdot \sqrt{P \cdot \Delta P / T}$$

wherein
- G: maximum possible flow of cooling air 7
- A: flowing area of flow control valve 20 at full-open state
- K: coefficient
- P: pressure of discharge air 4
- $\Delta P$: pressure difference across air flow control valve 20
- T: air temperature Such a relationship is shown in FIG. 4.

Figure 5:
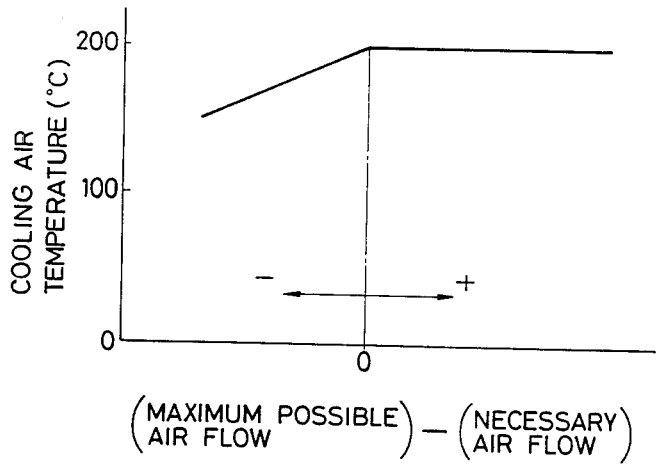
FIG. 5 is a diagram showing the relationship between the difference in the amount between the maximum possible air flow and the necessary air flow, and the cooling air temperature of the FIG. 1 embodiment of the present invention.

This maximum possible flow of the cooling air 7 compares with the necessary air flow calculated by the flow computing element 21. When the necessary air flow is smaller than the maximum possible flow of the cooling air 7, as shown in FIG. 5, the cooling air temperature is maintained at a settled target temperature, for example 200° C. When the necessary air flow is larger than the maximum possible flow of the cooling air 7, the flow of the cooling water 8 is adjusted so as to lower the cooling air temperature.

The above cooling air temperature control is carried out by inputting the pressure measured by the manometer 22 and the necessary air flow calculated from the flow computing element 21 in a temperature computing element 12a, measuring the temperature (Tc) of the cooling air 7 by the thermometer 11, inputting the measured temperature (Tc) in the temperature computing element 12a, and calculating a signal for giving the necessary instructions to a cooling water adjustment valve 9 with the temperature computing element 12a.

The control based on the characteristics shown in FIG. 5 is dispensable since, it is possible to carry out an air flow amount control by utilizing with a large capacity air flow control valve 20 wherein the cooling air temperature is maintained at constant value, for example 200° C.

In such a case, the temperature computing element 12a should be a feedback control type so that the cooling air temperature (Tc) is a predetermined value.

According to the present invention, even if the atmospheric temperature changes, the necessary cooling air flow corresponding to the firing temperature would be supplied into the apparatus. A gas turbine used for the ordinary power generating plant operates at constant speed under a normal operating condition, and in company with the change of the intake air temperature of the air compressor, the discharge pressure changes also. Namely, the change of discharge pressure of the air compressor is caused by the change of the intake air temperature. Accordingly, in company with the determination of the discharge pressure and the exhaust gas temperature, the firing temperature is determined in the first instance.

Therefore, it is possible to calculate the firing temperature according to the exhaust gas temperature and the discharge pressure as shown in the characteristics diagram of FIG. 2, and the calculated results are consistent with the actual firing temperature.

As explained in detail above, according to the present invention, the metal temperature of the hot gas parts of the gas turbine can be adjusted suitably, and further it is possible to contribute greatly to the improvement of the durability and the reliability without a decrease of the gas turbine heat efficiency.

We claim:

1. A cooling air flow controlling apparatus for a gas turbine comprising: an air compressor coupled directly with a gas turbine, a passage for introducing a portion of air discharged from said air compressor as cooling air flow into a hot gas section of said gas turbine, and a control valve for controlling cooling air flow disposed in said passage, a first means for detecting a discharge air pressure from said air compressor and for outputting a discharge air pressure signal, a second means for detecting an exhaust gas temperature of said gas turbine and for outputting an exhaust gas temperature signal, and a means having inputted therein relationships between an exhaust gas temperature of said gas turbine, a discharge air pressure of said air compressor, and a required cooling air flow amount through said control valve for calculating a required cooling air flow signal from said discharge air pressure signal of said first means and said exhaust gas temperature signal of said second means, whereby said required cooling air flow amount of said cooling air control valve is controlled by an output signal of said calculating means.

2. A cooling air flow controlling apparatus for a gas turbine according to claim 1, wherein conduit means is provided for introducing said air discharged from said air compressor exteriorly of said gas turbine, said control valve being an air flow adjustment valve, and said required cooling air flow amount being controlled by said air flow adjustment valve and supplied into a stator blade vicinity of said gas turbine.

3. A cooling air flow controlling apparatus for a gas turbine according to claim 1, wherein an intercooler is provided in said passage for cooling said discharged air portion which is thereafter supplied into a stator blade vicinity of said gas turbine.

4. A cooling air flow controlling apparatus for a gas turbine comprising: an air compressor coupled directly with a gas turbine, a passage for introducing a portion of air discharged from said air compressor as cooling air flow into a hot gas portion of said gas turbine, and a valve for controlling an amount of the cooling air flow disposed in said passage, a first means for detecting a discharge air pressure from said air compressor and for outputting a discharge air pressure signal, a second means for detecting an exhaust gas temperature of said gas turbine and for outputting an exhaust gas temperature signal, a means having inputted therein relationships between an exhaust gas temperature of said gas turbine, a discharge air pressure of said air compressor, and a required amount of the cooling air flow of said control valve for calculating a required cooling air flow signal from said discharge air pressure signal of said first means and said exhaust gas temperature signal of said second means, a means for inputting said discharge air pressure of said air compressor and a necessary air flow amount calculated from said calculating means in a temperature computing element, a means for measuring temperature of cooling air, and a means for comparing a maximum possible flow amount of said cooling air and a required cooling air flow amount, whereby the cooling air flow amount of said control valve is controlled by an output signal of said calculating means.

5. A cooling air flow controlling apparatus for a gas turbine according to claim 4, wherein when said required cooling air flow amount is smaller than said maximum possible air flow amount of said cooling air, temperature of said cooling air is maintained at a predetermined target temperature.

6. A cooling air flow controlling apparatus for gas turbine according to claim 5, wherein said cooling air temperature is maintained about 200° C.

7. A cooling air flow controlling apparatus for gas turbine according to claim 4, wherein said required cooling air flow amount is larger than said maximum possible air flow amount of said cooling air, a cooling water flow amount in an intercooler provided in said passage is adjusted so as to lower said cooling air temperature.

* * * * *